United States Patent
Jansson et al.

[11] Patent Number: 5,816,356
[45] Date of Patent: Oct. 6, 1998

[54] REAR WHEEL SUSPENSION DEVICE FOR MOTORCYCLES

[75] Inventors: Lars Jansson; Leif Gustafsson, both of Upplands Vasby, Sweden

[73] Assignee: Yamaha Hatsudoki Kabushiki Kaisha, Iwata, Japan

[21] Appl. No.: 594,645

[22] Filed: Feb. 2, 1996

[30] Foreign Application Priority Data

Feb. 3, 1995 [JP] Japan .................................. 7-017203

[51] Int. Cl.⁶ .................................................. B62D 61/02
[52] U.S. Cl. .......................................... 180/227; 180/284
[58] Field of Search .................................. 180/219, 227; 280/281.1, 283, 284, 285

[56] References Cited

U.S. PATENT DOCUMENTS

| | | | |
|---|---|---|---|
| 4,114,918 | 9/1978 | Lutz ..................................... | 180/227 X |
| 4,436,174 | 3/1984 | Morisono ................................ | 180/227 |
| 4,465,156 | 8/1984 | Richardson et al. .................... | 180/227 |
| 4,913,255 | 4/1990 | Takayanagi et al. ................... | 180/227 |
| 5,405,159 | 4/1995 | Klein et al. ............................. | 280/283 |

FOREIGN PATENT DOCUMENTS

| | | |
|---|---|---|
| 510404 | 12/1920 | France . |
| 915140 | 11/1946 | France . |
| 5-178261 | 7/1993 | Japan ..................................... 180/227 |
| 5-178262 | 7/1993 | Japan ..................................... 180/227 |
| 5-178263 | 7/1993 | Japan ..................................... 180/227 |
| 5-178264 | 7/1993 | Japan ..................................... 180/227 |
| 5-213257 | 8/1993 | Japan ..................................... 180/227 |
| 8175 | of 1914 | United Kingdom . |
| 101651 | of 1916 | United Kingdom . |
| 8603267 | 6/1986 | WIPO . |

*Primary Examiner*—Kevin Hurley
*Attorney, Agent, or Firm*—Knobbe, Martens, Olson & Bear LLP

[57] ABSTRACT

Several embodiments of rear wheel suspension systems for motorcycles wherein the leaf spring is employed that is contained within the suspension arm so as to be protected and yet facilitate servicing. The spring is loaded so as to provide a progressive rate and various damper arrangements are also disclosed employing either rotary or tubular-type dampers.

16 Claims, 7 Drawing Sheets

Figure 7

REAR WHEEL SUSPENSION DEVICE FOR MOTORCYCLES

BACKGROUND OF THE INVENTION

This invention relates to a wheel suspension system for vehicles and more particularly to an improved rear wheel suspension system for a motorcycle.

A wide variety of suspension systems has been proposed for suspending the vehicle wheels on a vehicle body so as to provide a smoother ride for the occupants of the vehicle. Generally, these arrangements utilize a spring which is loaded upon relative movement and some form of damping member for damping the relative movement.

With many types of vehicle applications, the actual layout of the suspension for the wheel depends to a large extend on the characteristics of the vehicle. Motorcycles are a prime example of where the vehicle construction dictates to a large extent the suspension arrangement. This is particularly true with respect to rear wheel suspension systems.

A very popular type of rear suspension arrangement for motorcycles employs a trailing arm assembly. The trailing arm assembly is pivotally supported on the vehicle frame at its forward end and carries the driven rear wheel at its rear end. In order to dampen and control the pivotal movement, it has been the practice to employ a hydraulic shock absorber, coil spring arrangement that is loaded between the frame and the trailing arm. Frequently, the manner in which the spring and shock absorber is loaded includes a linkage system so as to provide a variable or progressive rate of cushioning. By employing progressive cushioning, it is possible to provide a smoother ride through large suspension travels, but bottoming is also precluded or substantially resisted.

Generally, the suspension element comprised of the spring and the shock absorber is mounted at the center of the motorcycle and contiguous to the position where the trailing arm is pivotally supported on the frame. This presents a number of difficulties.

Specifically, the engine and transmission, which is normally contained in the crankcase of the engine, is also mounted in this same area. That is generally forwardly and, at times, above the pivotal joint for the front end of the trailing arm. Many of the engine auxiliaries, such as the exhaust and/or induction system, also are in this area and, thus, the space available for the shock absorber and the amount of total movement of the shock absorber is substantially limited.

In addition to these problems, this positioning for the shock absorber and coil spring makes it difficult to adjust the components for different riders and different riding styles. Furthermore, the components are disposed so that it is very difficult to replace them or service them.

It is, therefore, a principal object of this invention to provide an improved suspension arrangement for a vehicle wheel.

It is a further object of this invention to provide an improved and compact vehicle wheel suspension employing an arm-type suspension.

It is yet a further object of this invention to provide an improved wheel suspension for a motorcycle wherein the components are compact, protected and, nevertheless, readily serviceable and adjustable.

It is a further object of this invention to provide an improved progressive suspension arrangement for a motorcycle rear wheel.

SUMMARY OF THE INVENTION

This invention is adapted to be embodied in a vehicle wheel suspensions system that is comprised of a suspension arm having a first pivot for providing a pivotal connection of the suspension arm on a vehicle frame. A wheel suspension journals a wheel for rotation upon the suspension arm at a point spaced from the axis of the first pivot. A leaf spring is contained at least in substantial part in the suspension arm. A first connection is provided for fixing a first portion of the leaf spring relative to the suspension arm. A second connection is provided between a second portion of the leaf spring and the vehicle frame for effecting deflection of the leaf spring upon pivotal movement of the trailing arm about the first pivot axis.

DETAILED DESCRIPTION OF THE PREFERRED EMBODIMENTS OF THE INVENTION

Figure 1:
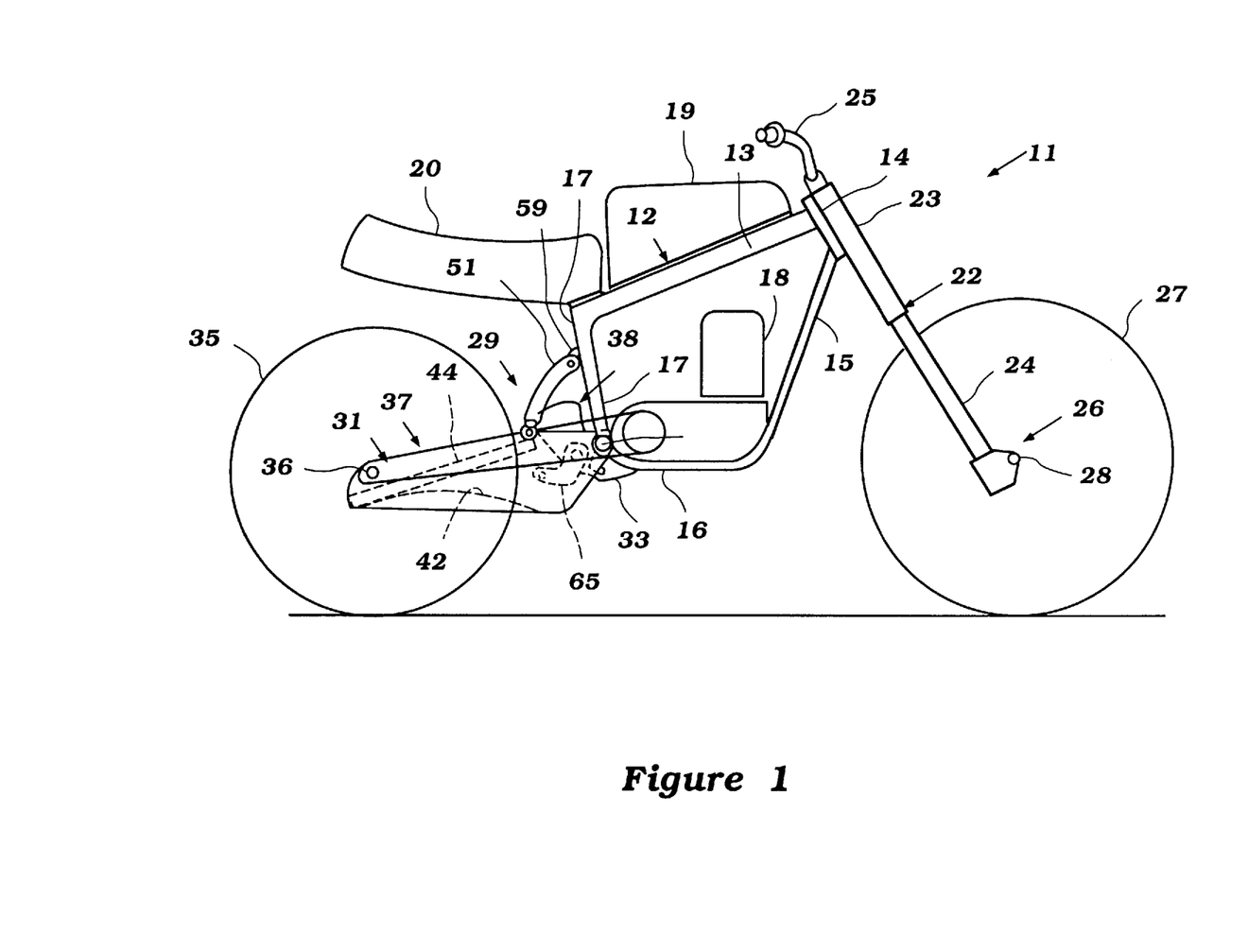
FIG. 1 is a side elevational view of a motorcycle constructed in accordance with an embodiment of the invention.

Referring now in detail to the drawings and initially to FIG. 1, a motorcycle constructed in accordance with an embodiment of the invention is identified generally by the reference numeral 11. The motorcycle 11 is composed of a perimeter style frame that is indicated by the reference numeral 12 which consists of upper rails 13 that extend generally forwardly and upwardly to connect to the upper end of a steering head 14. Down tubes 15 depend downwardly from the lower end of the steering head 14 and curve rearwardly to form lower rails that are indicated by the reference numeral 16. The lower rails 16 extend rearwardly and connect at their rearward ends to the lowermost portions of rear spars 17 which, in turn, extend vertically and connect to the rearward ends of the upper rails 13.

A powering internal combustion engine 18 is cradled within the frame 12 by any suitable means. Fuel is supplied to the engine 18 in a manner not shown by a fuel tank 19 which is affixed to the upper surface of the upper rails 13. Additionally a seat 20 is mounted by any suitable means to the rearmost portion of the upper rails 13 immediately behind the fuel tank 19 for accommodating a rider for the motorcycle 11.

A front vehicle wheel suspension system is indicated by the reference numeral 21 and composed of a twin telescopic fork assembly 22 that is journaled within the steering head 14. The fork assembly 22 is comprised of upper receiving stanchion tubes 23 and lower stanchion tubes 24. The upper stanchion tubes 23 are rotatably journaled to the steering head 14 for dirigible motion under the control of a handlebar assembly 25 which is affixed to the upper ends of the upper stanchion tubes 23.

The lower stanchion tubes 24 slidingly engage the upper stanchion tubes 23 at their upper ends for telescopic motion relative to the upper stanchion tubes 23 that is controlled by internal spring dampeners (not shown) for which the stanchion tubes 23 and 24 serve as housings. At their lower ends, the lower stanchion tubes 24 form a front wheel suspension 26 which rotatably journals a front wheel 27 by means of an axle 28.

A rear vehicle wheel suspension system is indicated by the reference numeral 29. This suspension system is composed primarily of a trailing suspension arm 31. The trailing suspension arm 31 is pivotally journaled by means of a first pivot 32 to the lower rear portion of the frame 12, henceforth referred to as the suspension arm pivot area and indicated by the reference numeral 33.

A rear wheel 35 is journalled at the rearmost portion of the suspension arm 31 by means of an axle 36. The rear wheel 35 is driven by the output shaft of the engine 18 by means which include a chain (not shown) disposed along the left-hand side of the suspension arm 31 as is the common practice in this art.

The suspension arm 31 is suspended from the frame 12 by means of a springing system and a damping system that are indicated by the reference numerals 37 and 38, respectively, and which control the magnitude and frequency of the deflection of the rear wheel 35 and trailing arm 31.

It is the conventional practice in this art to utilize a coil spring damper assembly with a tubular-type hydraulic damper housed within the coil spring as the deflection control for the rear vehicle wheel suspension system 29. This coil spring damper assembly is typically pivotally connected at its lower end to the suspension arm 31 directly or indirectly through a progressive spring rate mechanism and at its upper end to the frame 12. Problems exist with this configuration, however, in that such assemblies occupy a large amount of packaging space and tend to raise the height of the mass center for the motorcycle 11. Additionally, with this layout the coil spring is susceptible to damage caused by loose road chippings or gravel from the surface on which the motorcycle 11 is operating.

An embodiment of this invention eliminates these problems by utilizing a new spring damper assembly that is shown in FIGS. 1–4 and described below. The springing system 37 is first described with reference to FIG. 2 which is a cross-sectional view of the right side of the suspension arm 31. As is seen, the suspension arm 31 is hollow and has an opening 39 formed on its rearward end that is sealed by a cover 41 and through which a curved abutment 42 is mounted and held in position by means of a bolt 43.

Figure 2:
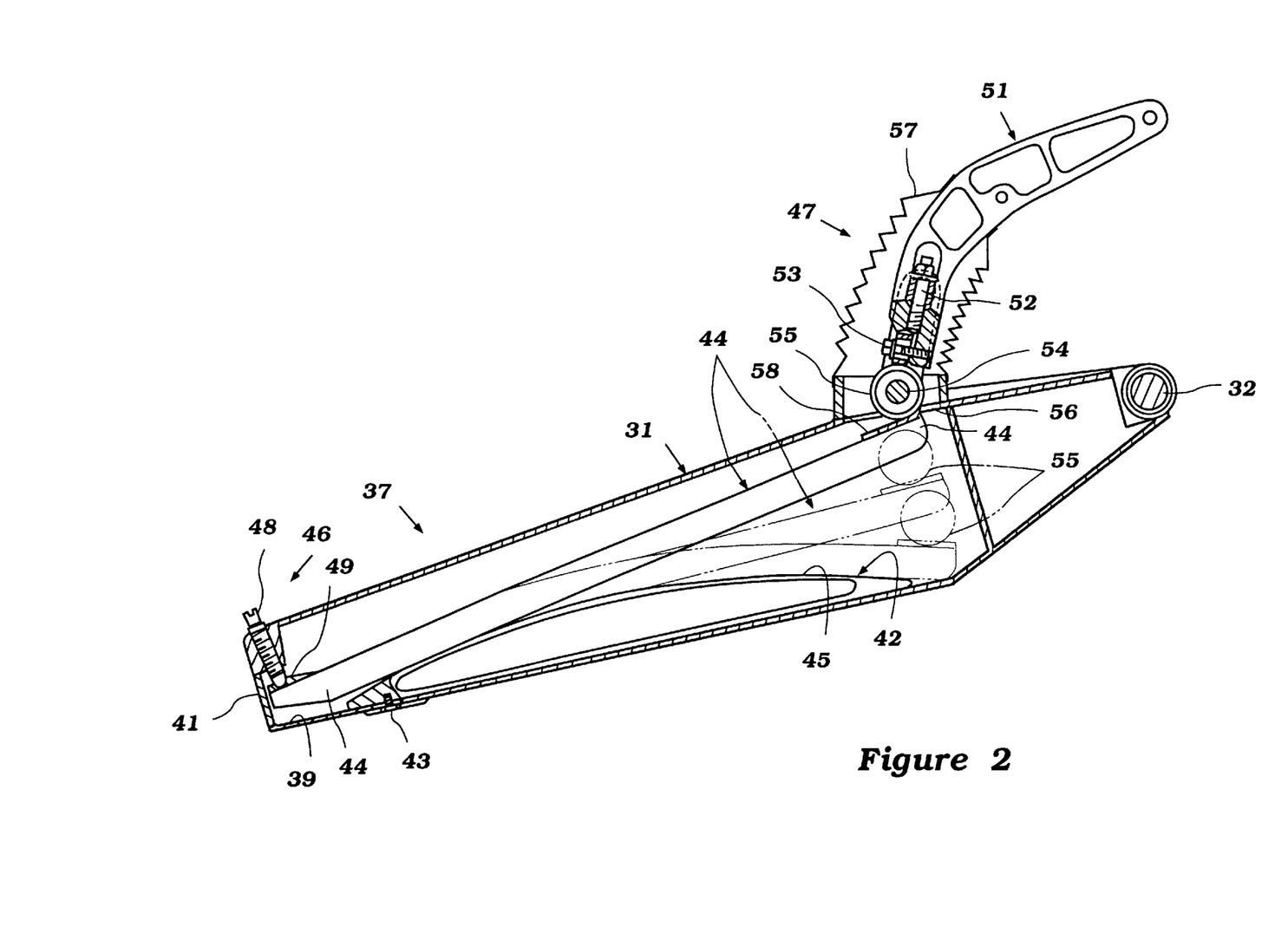
FIG. 2 is a cross-sectional view of a portion of the rear suspension system for the motorcycle.

A lightweight glass fiber reinforced plastic leaf spring that is indicated by the reference numeral 44 is also mounted within the right side of the suspension arm 31 above the curved abutment 42 and in contact with the arcuate upper surface 45 of the curved abutment 42.

The leaf spring 44 is held in position within the suspension arm 31 by first and second leaf spring connections that are indicated by the reference numerals 46 and 47, respectively. The first leaf spring connection 46 is comprised of a screw 48 that threadingly engages the suspension arm 31 at it rearward end and whose lower end engages a spherical recess 49 formed at the upper rear portion of the leaf spring 44. Adjustment of the screw 48 inwardly and outwardly respectively increases and decreases the static preload on the rearward end of the leaf spring 44 and thus the force with which the rear of the leaf spring 44 is pressed against the curved abutment 42.

The second leaf spring connection 47 consists of a support arm 51 at whose lower end is disposed a threaded adjusting screw 52 that is controlled by an adjusting nut 53 which is affixed to the support arm 51 in a manner which permits rotatable motion about the adjusting screw axis. A pivot shaft 54 is affixed to the lower end of the threaded adjusting screw 52 about which is rotatably journaled a roller that is indicated by the reference numeral 55. The roller 55 extends into the inside of the suspension arm 31 through an opening 56 formed in the forward upper surface of the right suspension arm 31. The opening 56 is sealed by a rubber bellow 57 which extends upwards and sealingly engages the support arm 51 at its mid-section. The roller 55 contacts a tapered steel plate 58 that is affixed to the upper forward edge of the leaf spring 44.

The uppermost portion of the support arm 51 is affixed to a bracket 59 that is, in turn, affixed to the right rear frame spar 17. The connection of the arm 51 to the bracket 59 permits pivotal adjustment of the arm 51. Such adjustment changes the position at which the roller 55 contacts the leaf spring 44. This changes the effective length of the spring and hence its effective rate for ride control.

With the above described second leaf spring connection configuration, the preload force acting on the front of the leaf spring 44 is adjusted in the following manner. Selectively tightening or loosening the adjusting nut 53 located above the roller 55 will position the roller 55 further into or out of the suspension arm opening 56 and thus change the force with which the roller 55 contacts the tapered steel plate portion 58 of the leaf spring 44.

The rear springing system 37 functions in the following manner. When the rear wheel 35 hits a bump in the surface on which the motorcycle 11 is operating, the suspension arm 31 pivots upwardly about the first pivot 32, while the first leaf spring connection 46 remains fixed relative to the frame 12. This causes the roller 55 to force the leaf spring 44 to bend at the location where it contacts the upper arcuate surface 45 of the curved abutment 42, which is initially at the rearmost portion of the curved abutment 42.

Continued upward deflection of the suspension arm 31 causes the leaf spring 44 to bend further and its contact point with the curved abutment 42 to move forward along the upper arcuate surface 45 of the curved abutment 42. This reduces the effective length of the leaf spring 44 and therefore increases the spring rate. Thus, a progressive spring rate is achieved whose rising rate characteristics are determined by the contour of the upper arcuate surface 45 of the curved abutment 42 and which may be varied by utilizing curved abutments 42 of varying upper surface arcuate contours 45.

Figure 3:
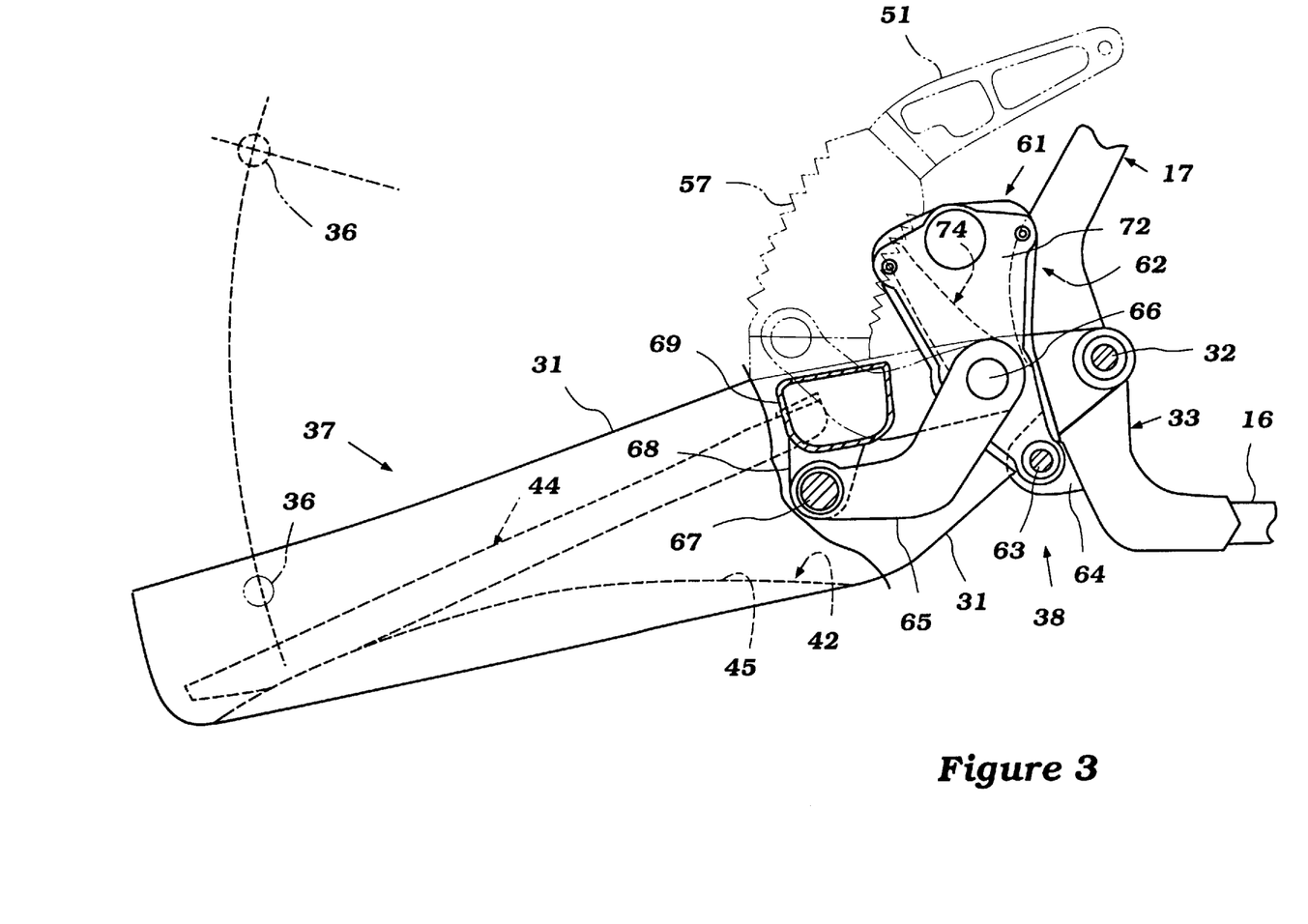
FIG. 3 is an enlarged side elevational view of the rear suspension system of FIG. 2 with some of the components shown in phantom and with portions broken away and shown in section.

The damping system 38 is now described with reference to FIG. 3. A rotary-type hydraulic damper that is indicated by the reference numeral 61 and will be described in detail later comprises a first component of a linkage system 62. The damper 61 is pivotally mounted at its lower end by means of a pivot 63 to a bracket 64 which is in turn affixed to the suspension arm pivot area 33 of the frame 12. A linkage bracket 65 comprises the second and final component of the linkage system 62 and is affixed at its upper end to a damping element shaft 66 which is rotatably journaled within the hydraulic damper 61 near its midsection. At its rearward end the linkage bracket 65 is affixed to a further pivot shaft 67 that is rotatably journaled within a bracket 68. The bracket 68 extends upwards and is rigidly connected to the center of a suspension arm cross member that is indicated by the reference numeral 69 and extends from the left side to the right side of the suspension arm 31.

Figure 4:
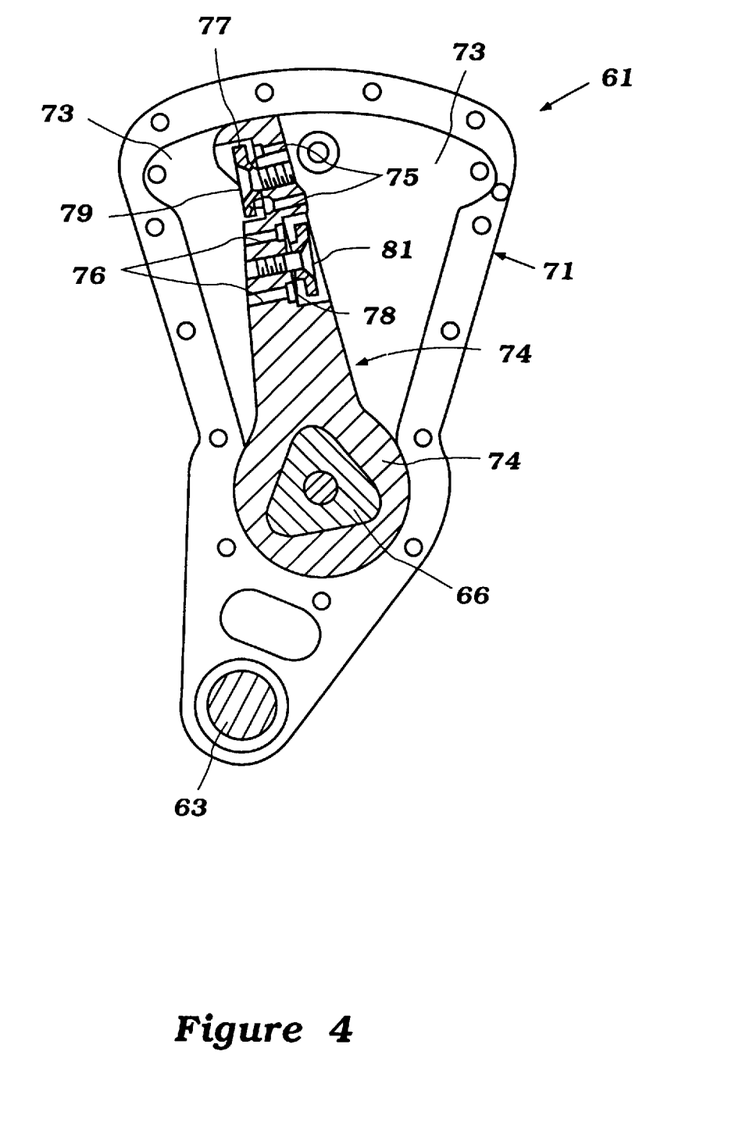
FIG. 4 is a cross-sectional view of the rear suspension system hydraulic damper used in the embodiment of the invention illustrated in FIGS. 1–3.

The hydraulic damper 61 will now be described with additional reference to FIG. 4. The damper 61 consists of a housing 71 that is sealed by a cover 72 and in which is disposed an oil chamber 73. A blade-shaped piston lever is indicated by the reference numeral 74 and affixed at its lower end to the damping element shaft 66 such that the piston lever 74 may rotate within the oil chamber 73 about the shaft 66. The piston lever 74 divides the oil chamber 73 into two sectional chambers. Oil may pass from one sectional chamber to the other through oil passages 75 and 76 whose outlets are controlled by valves 77 and 78.

The valves have their preload controlled by threaded adjusting screws 79 and 81 which control the pressure at which the valves 77 and 78 will open and thus the degree of damping caused by the oil flow from one section of the oil chamber 73 to the other.

The damping system 38 functions in the following manner. Upward deflection of the suspension arm 31 as previously described causes the linkage bracket 65 to rotate clockwise about the hydraulic damper 61 which is itself rotating clockwise about the pivot 63 to a slight degree. This rotation of linkage bracket 65 causes the damping element shaft 66 to likewise rotate clockwise which, in turn, causes the piston lever 74 to rotate clockwise towards the front of the housing 71. This forward rotation is controlled by the rate at which oil flows from the forward to the rearward oil chamber 73. In this instance, the oil flows through the passages 75 past the valve 77 which is forced toward the adjusting screw 79 and into the rearward oil chamber 73. No oil flows through the lower oil passage 76 since the oil in the forward oil chamber 73 tends to push the valve 78 up against and thus seal the openings for the oil passages 76.

Thus, it is readily apparent that the above described damping system 38 provides resistance to the movement of the suspension arm 31 that can be easily varied by means of the adjusting screws 79 and 81. It should also be noted that the damping resistance in compression does not necessarily have to equal the damping resistance in extension since the adjusting screws 79 and 81 may be set to different dispositions within the piston lever 74.

Figure 5:
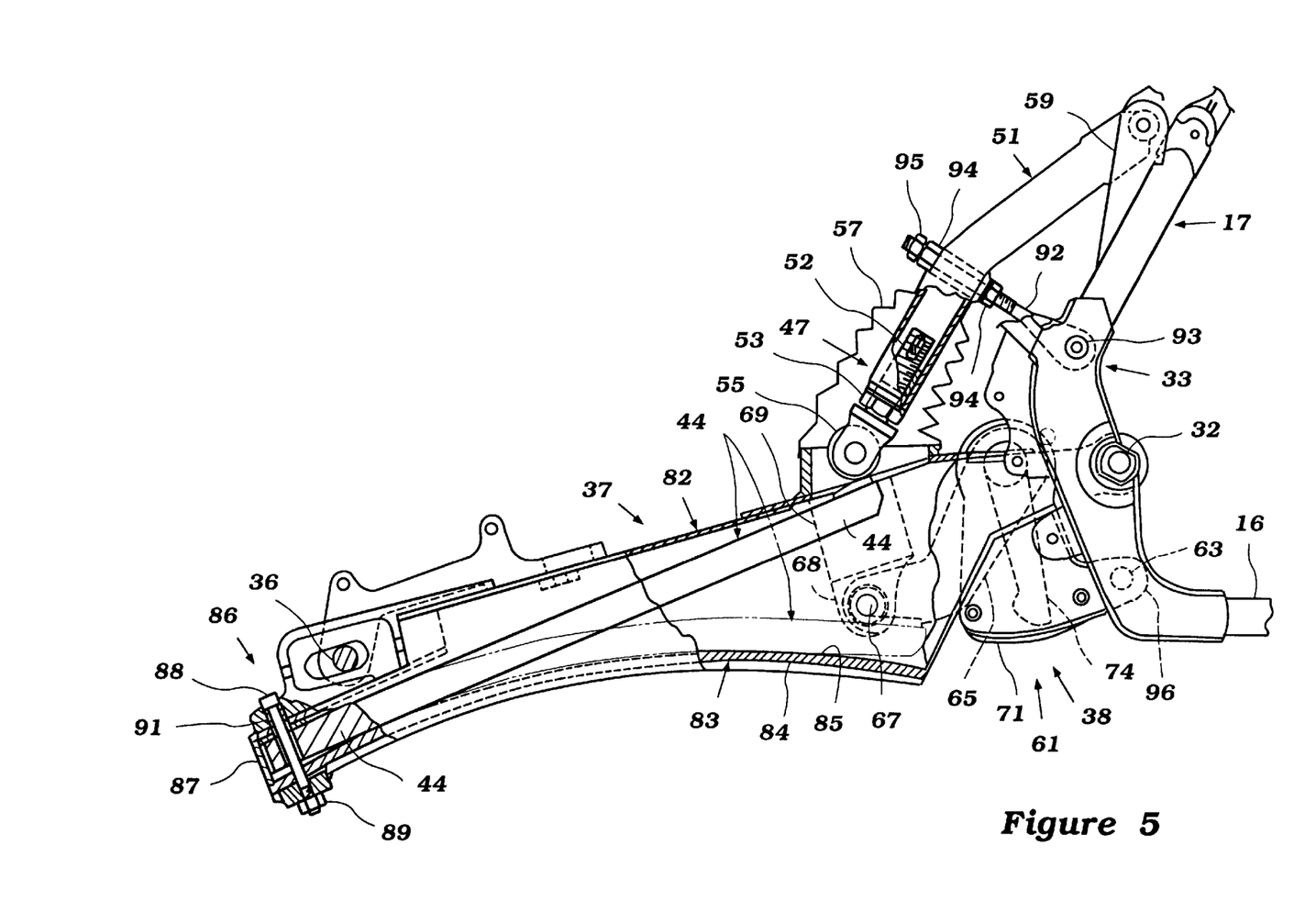
FIG. 5 is a cross-sectional view similar to FIG. 2 and shows another embodiment of the invention.
Figure 6:
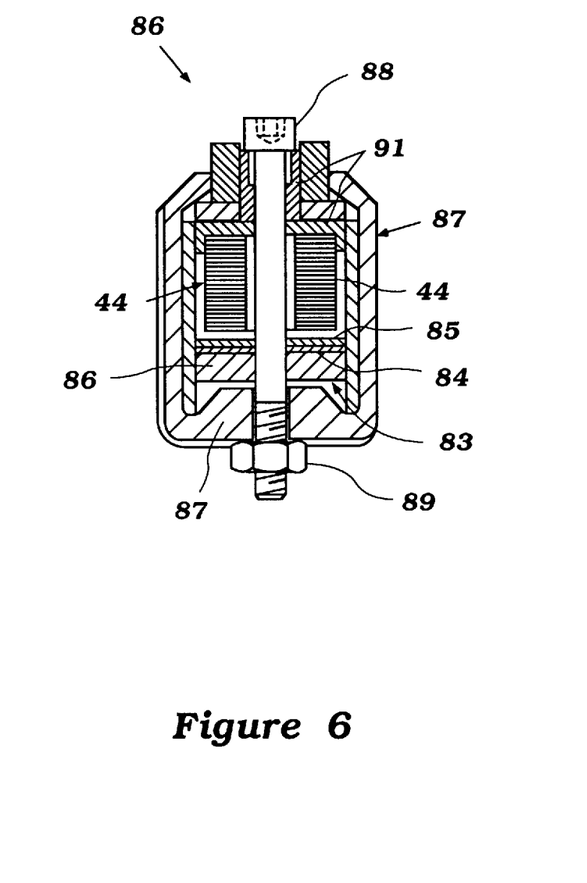
FIG. 6 is an enlarged cross-sectional view of the variable leaf-spring connection used in the embodiment of FIG. 5.

A further embodiment of the invention in which both the springing and damping systems 37 and 38 for the rear vehicle wheel suspension system 29 have been modified is shown in FIGS. 5 and 6. In this embodiment, the separate curved abutment 42 has been eliminated. Instead, a new suspension arm 82 whose lower surface, indicated by the reference numeral 83, comprises an arcuate member is utilized. A thin steel sheet 84 is laminated to the upper surface of the suspension arm arcuate lower surface 83 for inhibiting wear on the lower surface 83 while a plastic sheet 85 is laminated to the top surface of the steel sheet 84 for inhibiting wear on the leaf spring 44 which contacts the plastic sheet 85.

A new first leaf spring connection has also been included and is indicated by the reference numeral 86. A cover 87 encloses the open end of the suspension arm 82 and extends forwardly to terminate at a location that is forward of an adjusting bolt 88. The adjusting bolt 88 extends downwardly through holes formed in the upper surface of the cover 87, suspension arm 82, leaf spring 44, plastic sheet 85, steel sheet 84, suspension arm lower surface 83 and the lower surface of the cover 87 and threadingly engages a locking nut 89 at its lower end.

A slide cover 91 is also disposed between the head of the adjusting bolt 88 and the leaf spring 44. The above first leaf spring connection 86 adjusts the initial static preload on the rear of the leaf spring 44 in the following manner. Tightening the adjusting bolt 88 causes the bolt 88 to extend further through the lock nut 89. This also causes the slide cover 91 to move downwards and thus increase the load on the end of the leaf spring 44 and deflect the end of the spring 44 about the adjacent curved surface 83.

The manner of mounting the upper support arm 51 to the frame 12 has also been modified in order to enable the angular disposition of the second leaf spring connection 47 relative to the frame 12, and thus the initial preload with which the roller 55 contacts the forward end of the leaf spring 44, to be varied along with the effective length.

The uppermost portion of the support arm 51 is pivotally connected to the bracket 59. An adjustable length connecting arm that is indicated by the reference numeral 92 is rotatably journaled to the right suspension arm pivot area 33 by a pivot 93 located above the suspension arm first pivot 32 and has a threaded portion which extends through the middle portion of the support arm 51 and is bounded by two adjusting nuts 94 and a locking nut 95. With this configuration, the angular disposition of the support arm 51 relative to the frame 12 may be varied by loosening the locking nut 95 on the connecting arm 92 and adjusting the adjusting nuts 94 which also effectively varies the position of the roller 55 in the suspension arm opening 56. The effective length of the spring 44 is also changed by this pivotal movement of the arm 51. Thus the effective rate of the spring 44 is adjusted. This mechanism may also be utilized with the first described embodiment of FIGS. 1 through 4.

Thus, the springing system 37 once again provides a progressive spring rate for increasing suspension arm deflection while further providing an additional means for adjusting the initial static preload on the front of the leaf spring 44.

The damping system 38 has also been extensively modified for this embodiment. The hydraulic damper 61 is now mounted upside down relative to the previous embodiment with the damping element shaft 66 extending through the housing 71 at its upper end and piston lever 74 depending downwards from the shaft 66. An extended portion 96 of the housing 71 is formed at the forward lower end of the housing 71 and is pivotally mounted to the pivot shaft 63 while the attachment for the linkage bracket 65 remains unchanged.

The damping system 38 functions in a manner identical to that in the previous embodiment and will not be elaborated on further. Thus, it is seen that the above damping system configuration provides adequate damping control for the rear vehicle wheel suspension system 29 while also repositioning the damping system 38 in a manner that lowers the mass center for the motorcycle 11 and also provides additional packaging space for other vehicle components such as the exhaust or induction systems.

Figure 7:
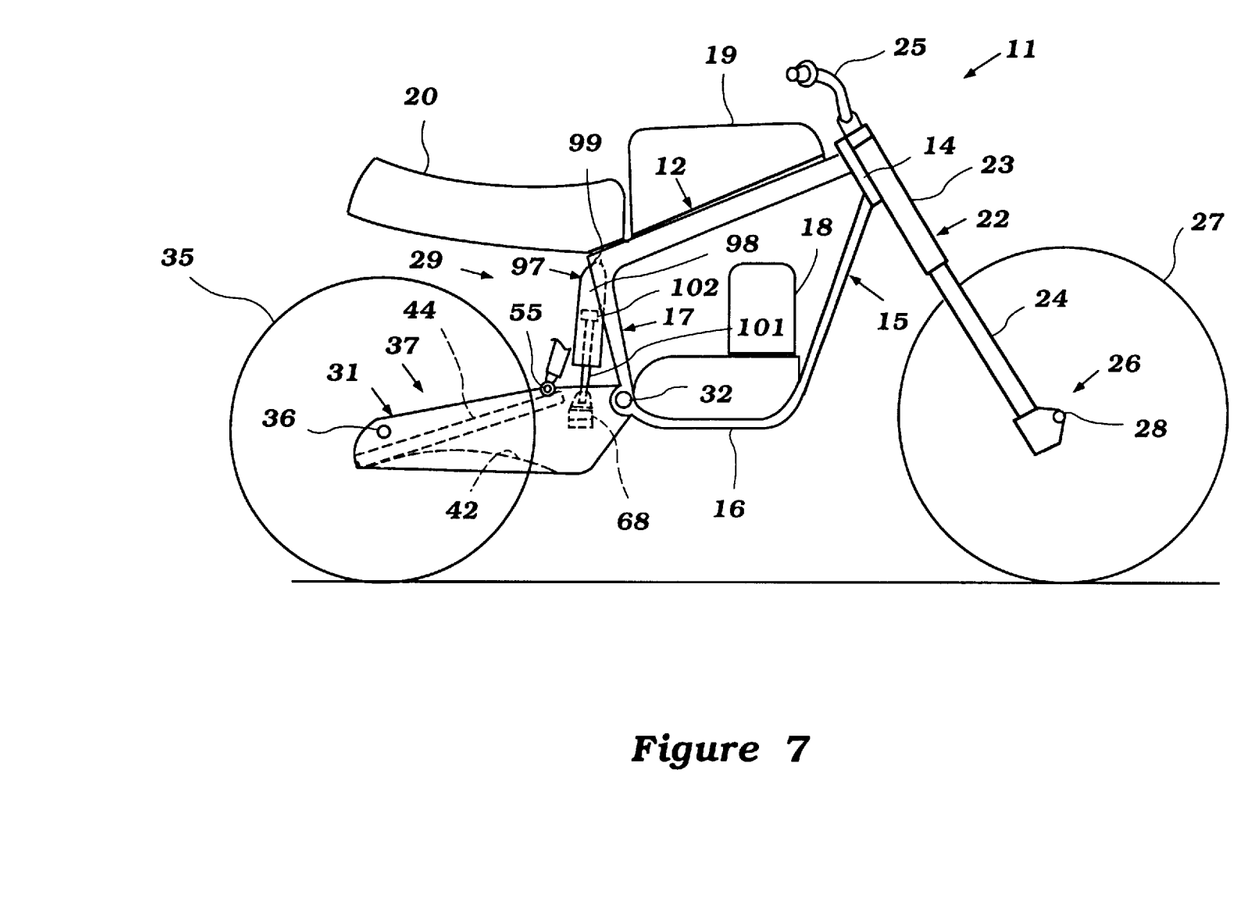
FIG. 7 is a side elevational view similar to FIG. 1 and shows still another embodiment of the invention.

FIG. 7 illustrates a further embodiment of the invention where the springing system 37 of the first embodiment, which utilizes a curved abutment 42 as a means of achieving a rising rate for the leaf spring 44, is used in conjunction with a conventional tubular-type hydraulic damping unit that is indicated by the reference numeral 97 and consists of a housing 98 that is pivotally connected at its upper end to a shaft 99 which extends from the rearmost portion of the left upper rail 13 to the rearmost portion of the right upper rail 13. The housing 98 serves as an oil chamber into which a shaft 101 extends from the lower end of the housing 98. A valved piston 102 is disposed at the upper end of the shaft 101 within the housing 98 while the lower end of the shaft 101 is pivotally journaled about the suspension arm bracket 68.

Pivotal motion of the suspension arm 31 displaces the piston 102 relative to the housing 98. This motion is resisted by the oil in the housing 98 which is forced through the valves formed integral to the piston 102. Thus, the above system provides adequate damping for the rear vehicle wheel suspension system 29.

From the foregoing description, it should be readily apparent that the described suspension systems provide a compact assembly, one in which the suspension characteristics may be easily adjusted and also one in which various elements can be easily replaced even though they are protected from the elements.

Of course, the description of the foregoing embodiments is that of certain preferred embodiments of the invention. Those skilled in the art will readily understand how various changes and modifications may be made without departing from the spirit and scope of the invention, as defined by the appended claims.

What is claimed is:

1. A vehicle wheel suspension system comprised of a suspension arm having a first pivot for providing a pivotal connection of said suspension arm on a vehicle frame, a wheel suspension for journaling a wheel for rotation upon said suspension arm at a point spaced from the axis of said first pivot, a leaf spring contained at least in substantial part in said suspension arm, a first connection between said leaf spring and said suspension arm for restraining a first portion of said leaf spring relative to said suspension arm, and a second connection between a second portion of said leaf spring and the vehicle frame, said second connection being formed by a roller follower carried by the frame and engaged with said leaf spring for effecting deflection of said leaf spring upon pivotal movement of said suspension arm about said first pivot, said first and said second connections being spaced from said first pivot.

2. A vehicle wheel suspension system comprised of a suspension arm having a first pivot for providing a pivotal connection of said suspension arm on a vehicle frame, a wheel suspension for journaling a wheel for rotation upon said suspension arm at a point spaced from the axis of said first pivot, a leaf spring contained at least in substantial part in said suspension arm, a first connection between said leaf spring and said suspension arm for restraining a first portion of said leaf spring relative to said suspension arm, and a second connection between a second portion of said leaf spring and the vehicle frame for effecting deflection of said leaf spring upon pivotal movement of said suspension arm about said first pivot, at least one of said connections to said leaf spring being adjustable for adjusting the preload on said leaf spring.

3. A vehicle wheel suspension system as set forth in claim 2, wherein both of the connections to the leaf spring are adjustable for adjusting the preload on the leaf spring.

4. A vehicle wheel suspension system as set forth in claim 3, wherein at least one of the connections to the leaf spring affords adjustment in the effective length of the leaf spring.

5. A vehicle wheel suspension system comprised of a suspension arm having a first pivot for providing a pivotal connection of said suspension arm on a vehicle frame, a wheel suspension for journaling a wheel for rotation upon said suspension arm at a point spaced from the axis of said first pivot, a leaf spring contained at least in substantial part in said suspension arm, a first connection between said leaf spring and said suspension arm for restraining a first portion of said leaf spring relative to said suspension arm, a second connection between a second portion of said leaf spring and the vehicle frame for effecting deflection of said leaf spring upon pivotal movement of said suspension arm about said first pivot, and an abutment carried by said suspension arm about which said leaf spring is deformed upon pivotal movement of said suspension arm.

6. A vehicle wheel suspension system as set forth in claim 5, wherein the abutment is curved for progressively changing the rate of the leaf spring upon the pivotal movement of the suspension arm about the first pivot.

7. A vehicle wheel suspension system as set forth in claim 6, wherein the abutment is also contained within the suspension arm.

8. A vehicle wheel suspension system as set forth in claim 5, wherein the suspension arm forms an enclosure around the leaf spring and the abutment and wherein the suspension arm has an opening through which the leaf spring may be removed.

9. A vehicle wheel suspension system as set forth in claim 8, wherein the abutment is also removable through the opening.

10. A vehicle wheel suspension system as set forth in claim 1, further including a hydraulic damper loaded between the suspension arm and the vehicle frame for hydraulically damping the suspension movement of the suspension arm.

11. A vehicle wheel suspension system as set forth in claim 10, wherein the hydraulic damper is a rotary damper.

12. A vehicle wheel suspension system as set forth in claim 11, further including a linkage system for loading the rotary damper upon pivotal movement of the suspension arm.

13. A vehicle wheel suspension system as set forth in claim 12, wherein the linkage system comprises an arm fixed for rotation with the rotary element of the hydraulic damper and having a pivotal connection to the suspension arm.

14. A vehicle wheel suspension system as set forth in claim 10, wherein the hydraulic damper is a tubular-type damper.

15. A vehicle wheel suspension system as set forth in claim 14, further including a linkage system for loading the hydraulic damper upon pivotal movement of the suspension arm.

16. A vehicle wheel suspension system as set forth in claim 15, wherein the wheel is driven by a drive element carried by the frame and which extends along one side of the suspension arm, the leaf spring being juxtaposed to the other side of the suspension arm.

* * * * *

UNITED STATES PATENT AND TRADEMARK OFFICE
CERTIFICATE OF CORRECTION

PATENT NO. : 5,816,356
DATED : October 6, 1998
INVENTOR(S) : Lars Jansson & Leif Gustafsson It is certified that error appears in the above-identified patent and that said Letters Patent is hereby corrected as shown below:

On the title page, item [73]:

**Second Assignee is missing. Please include the following company:
--OHLINS RACING AB, Upplands Vasby, Sweden.--**

Signed and Sealed this

Eighth Day of August, 2000

Attest:

Q. TODD DICKINSON

*Attesting Officer*  *Director of Patents and Trademarks*